United States Patent
Youngwerth, Jr. et al.

(10) Patent No.: US 9,797,460 B2
(45) Date of Patent: Oct. 24, 2017

(54) CLUTCH APPARATUS EMPLOYING DUAL CONCENTRIC CLUTCHES

(76) Inventors: Albert James Youngwerth, Jr., Boise, ID (US); Daniel Scott Youngwerth, Boise, ID (US); Sean Gabriel Brown, Boise, ID (US)

( * ) Notice: Subject to any disclaimer, the term of this patent is extended or adjusted under 35 U.S.C. 154(b) by 758 days.

(21) Appl. No.: 12/794,717

(22) Filed: Jun. 4, 2010

(65) Prior Publication Data

US 2010/0307886 A1 Dec. 9, 2010

Related U.S. Application Data

(60) Provisional application No. 61/184,665, filed on Jun. 5, 2009.

(51) Int. Cl.
| | |
|---|---|
| F16D 21/06 | (2006.01) |
| F16D 43/12 | (2006.01) |
| F16D 13/52 | (2006.01) |

(52) U.S. Cl.
CPC .............. *F16D 43/12* (2013.01); *F16D 13/52* (2013.01); *F16D 21/06* (2013.01); *F16D 2021/0676* (2013.01)

(58) Field of Classification Search
CPC .......... F16D 43/10; F16D 43/12; F16D 21/06; F16D 21/08; F16D 13/385; F16D 43/08; F16D 13/52; F16D 2021/0676

USPC .... 192/35, 48.3, 70.23, 83, 85.5, 96, 103 A, 192/105 B
See application file for complete search history.

(56) References Cited

U.S. PATENT DOCUMENTS

| | | | |
|---|---|---|---|
| 865,450 A * | 9/1907 | Sturtevant | F16D 43/12 192/105 C |
| 1,870,647 A * | 8/1932 | Rawson | F16D 43/10 192/105 C |
| 3,582,986 A | 6/1971 | Yokoyama | |
| 4,645,049 A * | 2/1987 | Matsuda et al. | 192/35 |
| 6,533,056 B1 | 3/2003 | Maimone | |
| 6,814,208 B2 * | 11/2004 | Drussel et al. | 192/105 B |
| 7,014,026 B2 * | 3/2006 | Drussel et al. | 192/105 B |
| 7,963,381 B2 * | 6/2011 | Inomori et al. | 192/105 B |
| 2009/0242351 A1 * | 10/2009 | Youngwerth, Jr. et al. | 192/103 A |

* cited by examiner

*Primary Examiner* — Terry Chau

(57) ABSTRACT

A clutch apparatus is disclosed having concentrically spaced inner and outer clutches. The inner and outer clutches are coupled for rotation via a coupling ring. The present invention is well suited to a configuration wherein one of the clutches is dynamically actuated and one of the clutches is manually disengageable by the operator using a clutch lever. In this configuration, the operation of the clutch lever by the operator is unaffected by the dynamically actuated clutch. The concentric configuration of the clutches is beneficial in allowing the improved clutch to occupy a similar space compared to a traditional clutch mechanism.

14 Claims, 5 Drawing Sheets

US 9,797,460 B2

CLUTCH APPARATUS EMPLOYING DUAL CONCENTRIC CLUTCHES

CROSS-REFERENCE TO RELATED APPLICATION

This application claims the benefit of U.S. patent application No. 61/184,665 filed Jun. 5, 2009.

BACKGROUND OF THE INVENTION

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled.

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often the motorcycle driver finds the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

In other situations, a torque-sensitive clutch may be beneficial to the operator. When racing, a vehicle may approach a corner at high speed. To negotiate the corner quickly, the driver must simultaneously brake and down shift the transmission to the appropriate gear to exit the corner with maximum acceleration. If the operator downshifts the transmission too quickly, the drive wheels of the vehicle will increase the engine speed and cause braking forces which may cause the driving wheels to loose traction. In this situation, it is desirable to have a clutch system that will allow the clutch to slip when the torque in the clutch is reversed from acceleration to deceleration.

Experienced motorcycle riders desire to have the capabilities of a dynamically actuated clutch, such as an automatic centrifugal clutch or a torque sensitive clutch but still want complete control of the clutch engagement/disengagement via a manually operated clutch disengagement lever. Existing dynamic clutch systems that incorporate a manual clutch disengagement lever suffer from a clutch lever whose operation and or feel changes as the dynamic engagement mechanism changes. For example, clutches that incorporate a centrifugal mechanism may require very little effort at low RPMs to overcome the centrifugal mechanism to disengage the clutch and more effort at high RPMs. Clutches that incorporate a torque-sensitive mechanism typically have a reduced clutch lever effort during deceleration. For experienced riders, the change in clutch lever "feel" is undesirable. The present invention seeks primarily to overcome the limitation of the change in "feel" of the clutch lever in a clutch system incorporating dynamic engagement mechanisms by isolating the dynamic engagement portion of the clutch system from the manual disengagement system. The present invention also seeks to fit in the space occupied by a typical clutch system.

SUMMARY OF THE INVENTION

The present invention solves the problem of the change in clutch lever feel caused by a dynamic engagement mechanism acting upon the clutch lever mechanism by separating the clutch into two concentric clutches with a rotational coupling mechanism between the two clutches. One clutch having a dynamic engagement mechanism and one clutch being spring loaded into a normally engaged position and provided with a release mechanism, coupled to a clutch lever, for disengagement by the operator. A coupling ring, disposed concentrically between the inner and outer clutches and rotationally splined to alternating plates within both the inner clutch and outer clutch, provides the mechanism necessary to rotationally couple the inner and outer clutches together.

In one embodiment, a centrifugal actuating mechanism using an expanding friction disk is incorporated as the dynamically actuated clutch. A centrifugally actuated expanding friction disk is disclosed in U.S. patent application Ser. No. 12/412,245 and is incorporated herein by reference. In another embodiment a centrifugal actuating mechanism using centrifugally actuated ball bearings is disclosed. Such ball bearing centrifugal actuating mechanisms are well known as typified by U.S. Pat. No. 6,533,056 and is incorporated herein by reference. In another embodiment, a torque sensitive mechanism is incorporated in one of the clutches. Such torque sensitive actuating mechanisms are well known as typified by U.S. Pat. No. 3,239,042 and is incorporated herein by reference. One skilled in the art will see that almost any dynamically actuated clutch mechanism is readily adaptable to the present invention.

DETAILED DESCRIPTION OF THE INVENTION

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The preferred embodiment of the present invention is disclosed in FIGS. 1a through 5 and incorporates an outer centrifugally actuated clutch and an inner spring loaded clutch actuated by a typical clutch lever (not shown). The inner and outer clutches are coupled rotationally through a coupling ring. Because the outer clutch and inner clutch share only rotational coupling and no axial coupling, the centrifugal expansion mechanism of the outer clutch has no effect on the "feel" of the clutch lever coupled to the inner clutch.

Figures 1A, 1B:
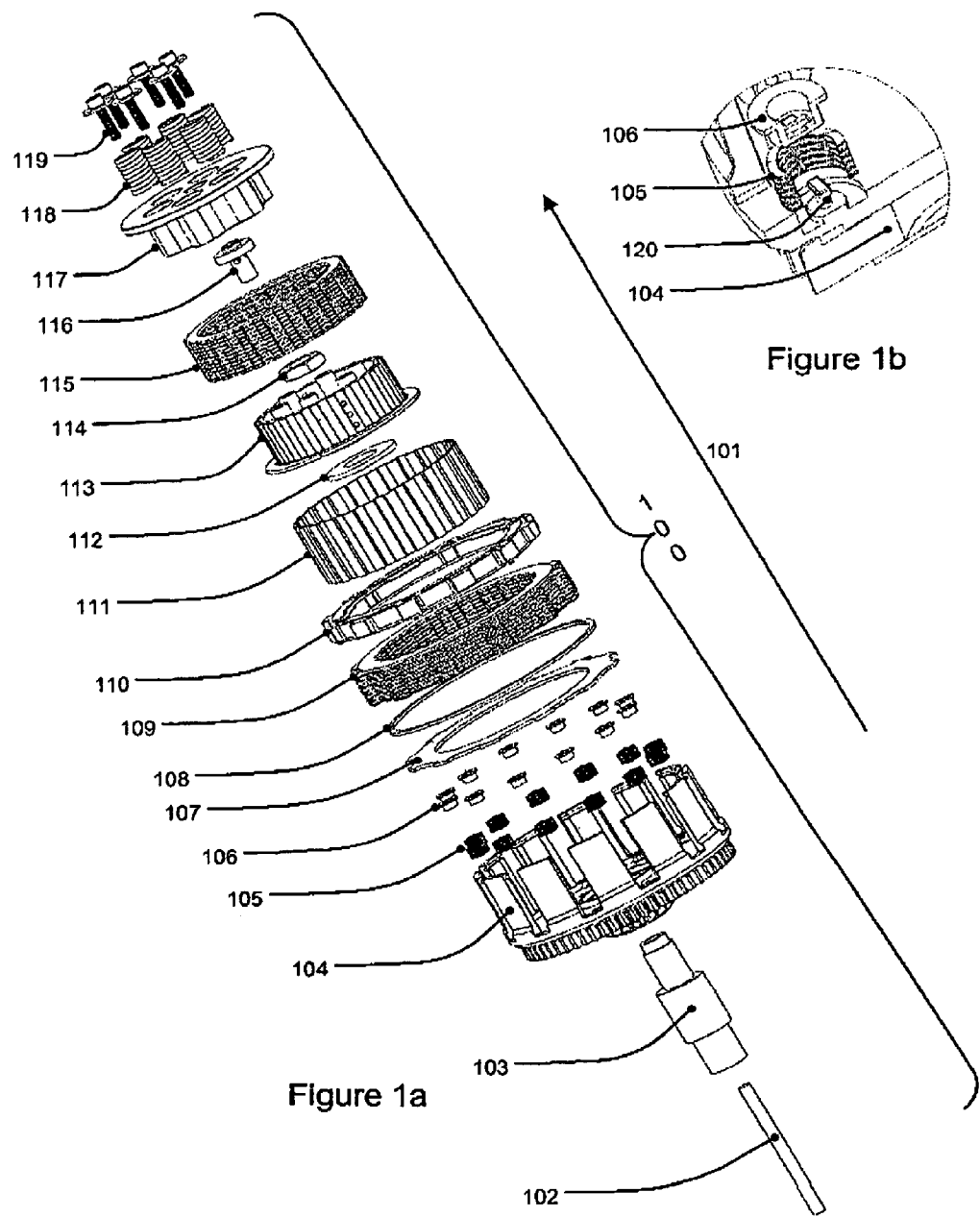
FIG. 1a is an exploded view of a preferred embodiment of the invention.
FIG. 1b is an exploded detail view of a limit spring and limt spring retainer in a preferred embodiment of the invention.

FIGS. 1a and 1b are an exploded view illustrating a preferred embodiment of a clutch apparatus (hereinafter "clutch") 100 in accordance with the present invention. For clarity purposes, reference will be made to "outward" and "inward" directions. Arrow 101 illustrates the outward direction. The term "outward direction" may also refer to a radial direction pointing away from a longitudinal axis. As used herein "inward" refers to the opposite direction of "outward."

Figure 2:
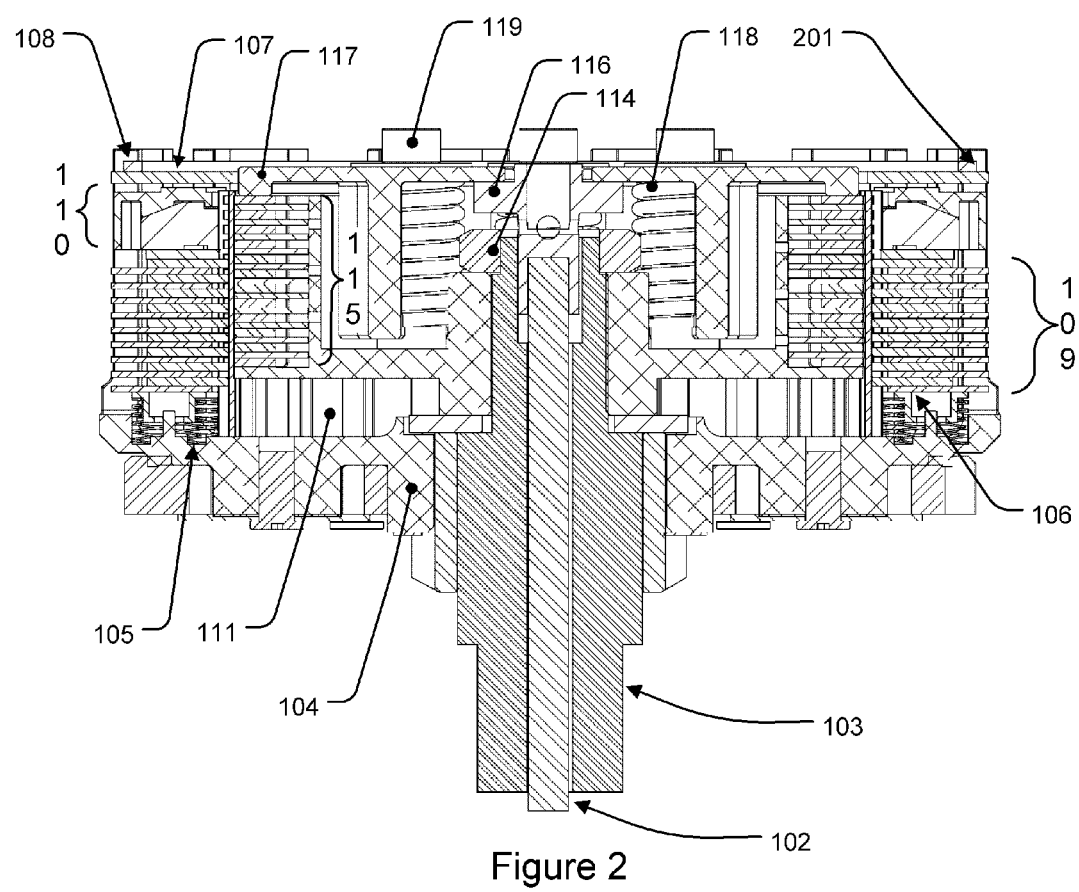
FIG. 2 is a cross section of a preferred embodiment of the invention.

The configuration of the clutch 100 is best shown in FIGS. 1a, 1b and 2. The clutch 100 is provided with a clutch basket 104 having an opening in the center for receiving the transmission input shaft 103. The transmission shaft 103 receives an actuation rod 102 and the outward end of the actuation rod 102 is received by a throwout 116. The outward end of the throwout 116 is received by the pressure plate 117. The inward end of the actuation rod 102 is mechanically coupled to a clutch lever (not shown) as is typically found in well known prior art clutch systems. The center clutch 113 receives and is rotationally coupled to the outward end of the transmission shaft 103 and is secured by the center clutch nut 114. A thrust washer 112 is disposed between the center clutch 113 and the clutch basket 104. The pressure plate 117 is axially coupled and spring loaded in an inwards direction to the center clutch 113 through the pressure plate springs 118 and pressure plate bolts 119. The configuration described thus far is typical of well known prior art clutch systems.

As can be best seen in FIGS. 1a and 1b, are circumferentially spaced limit springs 105, limit spring retainers 106 and limit spring T-posts 120 that are formed as part of the clutch basket 104. The limit spring retainer 105 is formed with a slot in the center for the limit spring T-post 120 to pass through. On the outward side of the limit spring retainer 106 and at a 90 degree angle to the slot, is formed a recess in the limit spring retainer 106 to capture the limit spring T-post 120. The dimensions of the limit spring 105 and limit spring retainer 106 are configured to pre-compress the limit spring 105 to a pre-determined force. In a preferred embodiment of the invention, the pre-compressed force of the sum of all of limit springs 105 is selected to be equal to or greater than force applied to the outer clutch pack 109 that is necessary to transfer the peak torque capacity a power source without slipping. In another embodiment of the invention, the sum of the force of all of the limit springs 105 is between 200 and 300 pounds. In another embodiment of the invention, no outer clutch force limiting mechanism is provided and the outer clutch pack 109 is limited in the inward axial direction by the clutch basket 104.

An outer clutch pack 109 is disposed radially between the clutch basket 104 and the coupling ring 111. The outer clutch pack 109 consists of outer driving plates that are coupled rotationally, via a suitable spline to the clutch basket 104 and outer driven plates being coupled rotationally with the outer diameter of the coupling ring 111, via a suitable spline. The outer driving plates are interleaved with the outer driven plates. When an axial force compresses the outer clutch pack 109, friction couples the outer drive plates to the outer driven plates, consequently rotationally coupling the clutch basket 104 to the coupling ring 111. Consequently, when there is no axial force compressing the outer clutch pack 109, the outer drive plates are free to rotate independently of the outer driven plates, allowing the clutch basket 104 to rotate independently of the coupling ring 111.

An expanding friction disk 110 (as disclosed in U.S. patent application Ser. No. 12/412,245) is located radially between the clutch basket 104 and the coupling ring 111 and is located axially between the outer clutch pack 109 and the outer clutch basket cover 107.

An inner clutch pack 115 is disposed radially between the center clutch 113 and the coupling ring 111. The inner clutch pack 115 consists of inner driven plates coupled rotationally to the center clutch 113 via a suitable spline and inner driving plates coupled rotationally with the inner diameter of the coupling ring 111 via a suitable spline. When an axial force compresses the inner clutch pack 115, friction couples the inner driving plates to the inner driven plates consequently rotationally coupling the center clutch 113 to the coupling ring 111. Consequently, when there is no axial force compressing the inner clutch pack 115, the inner driving plates are free to rotate independently of the inner driven plates, allowing the center clutch 113 to rotate independently of the coupling ring 111.

An outer clutch basket cover 107 contains the outer clutch pack 109 and expanding friction disk 110 axially. As can be seen best in FIG. 2, the outer clutch basket cover 107 is restrained in the outward axial direction by a snap ring 108 that is placed in a groove 201 formed near the outward edge of the clutch basket 104. The inner diameter of the outer clutch basket cover 107 is configured to be equal to or smaller in diameter than the inner diameter of the coupling ring 111 so as to capture the coupling ring 111 axially. In one embodiment, a thrust bearing material is disposed between the outer clutch basket cover 107 and the coupling ring 111 and the clutch basket 104 and the coupling ring 111 to prevent galling and/or reduce drag when the clutch basket 104 and outer clutch basket cover 1107 are rotating at a different speed than the coupling ring 111.

In another embodiment of the invention, bolts or another suitable fastener are used to secure the outer clutch basket cover 107 to the outward edge of the clutch basket 104. In another embodiment, the outer clutch basket cover 107 is coupled axially to the coupling ring 111 and the coupling ring is restrained axially by the center clutch 113.

The clutch basket 104 is typically coupled rotationally to a power input source such as an engine and the center clutch 108 is typically coupled rotationally to an output such as a transmission. In another embodiment of the invention, the clutch basket 104 is coupled rotationally to an output and the center clutch 108 is coupled rotationally to a power input.

Figure 3:
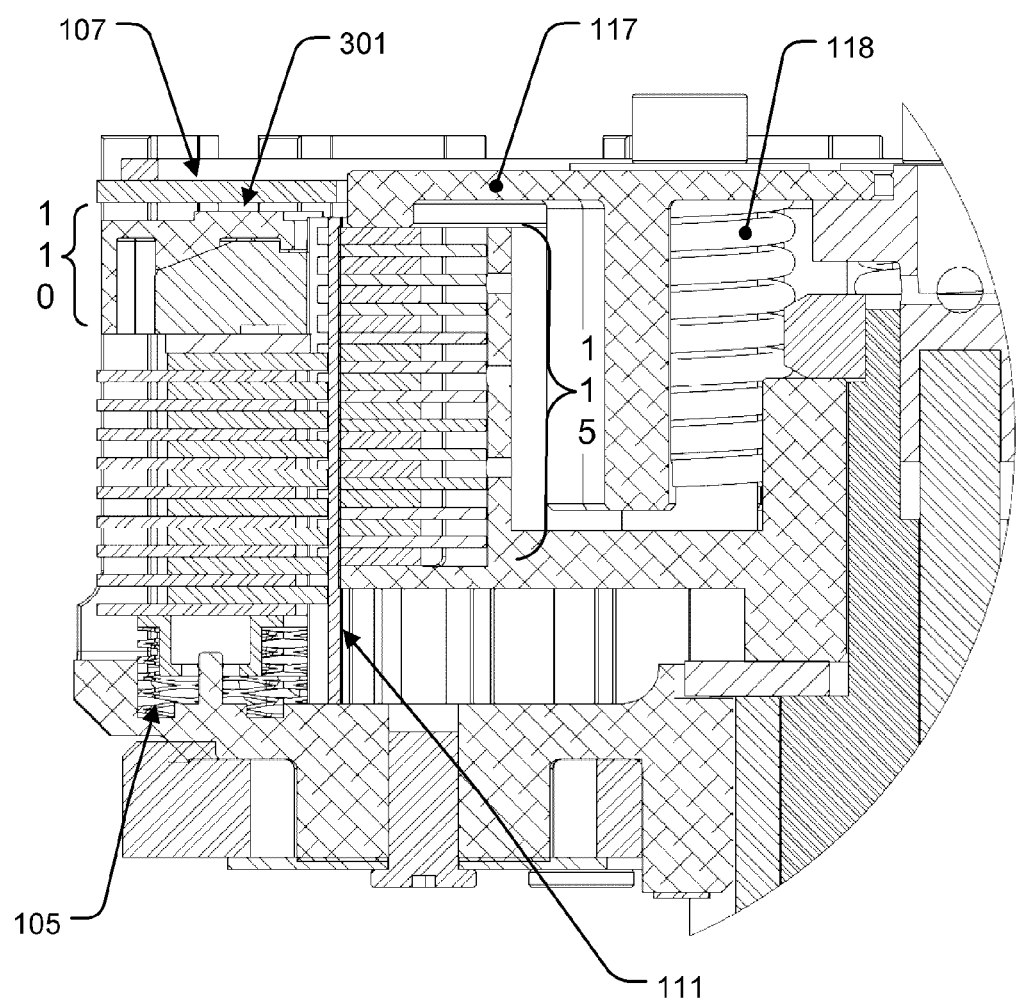
FIG. 3 is a detail cross section of a preferred embodiment of the invention incorporating an expanding friction disk where the expanding friction disk is incorporated in the outer clutch and is in the collapsed state and the inner clutch is spring loaded and in the engaged state.
Figure 4:
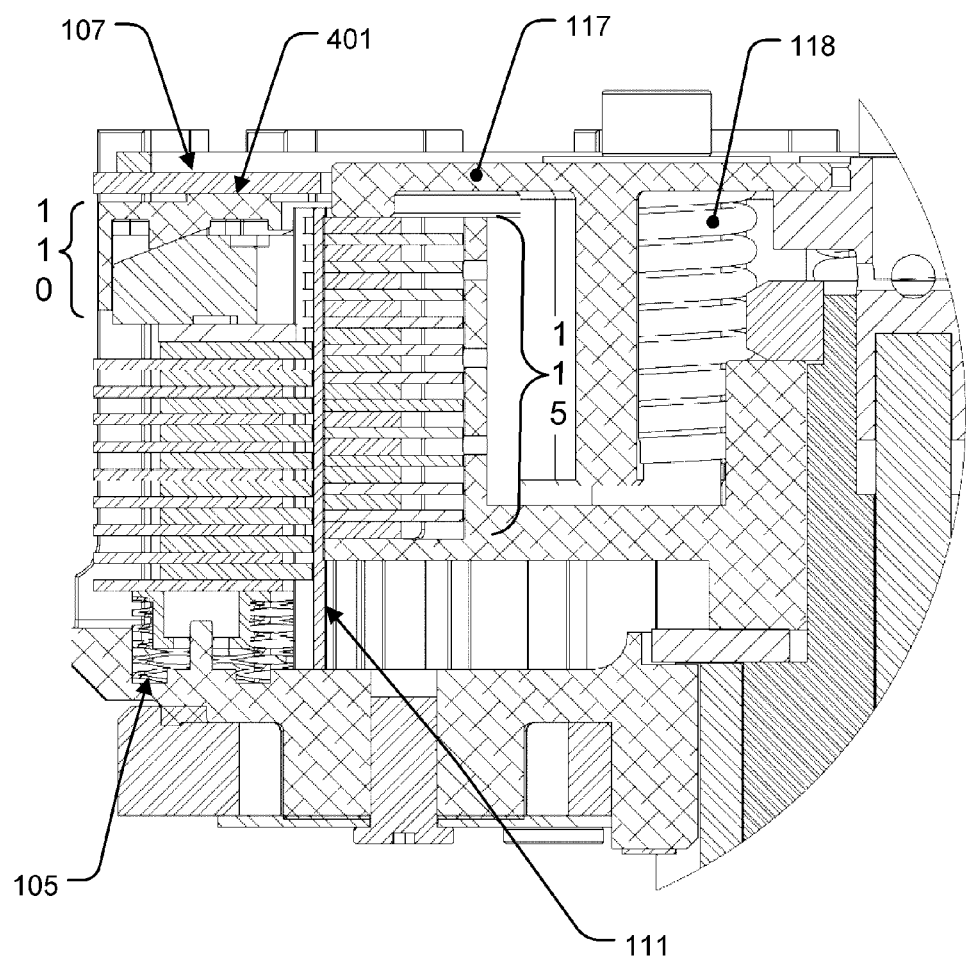
FIG. 4 is a detail cross section of a preferred embodiment of the invention incorporating an expanding friction disk where the expanding friction disk is incorporated in the outer clutch and is in the expanded state and the inner clutch is spring loaded and in the engaged state.
Figure 5:
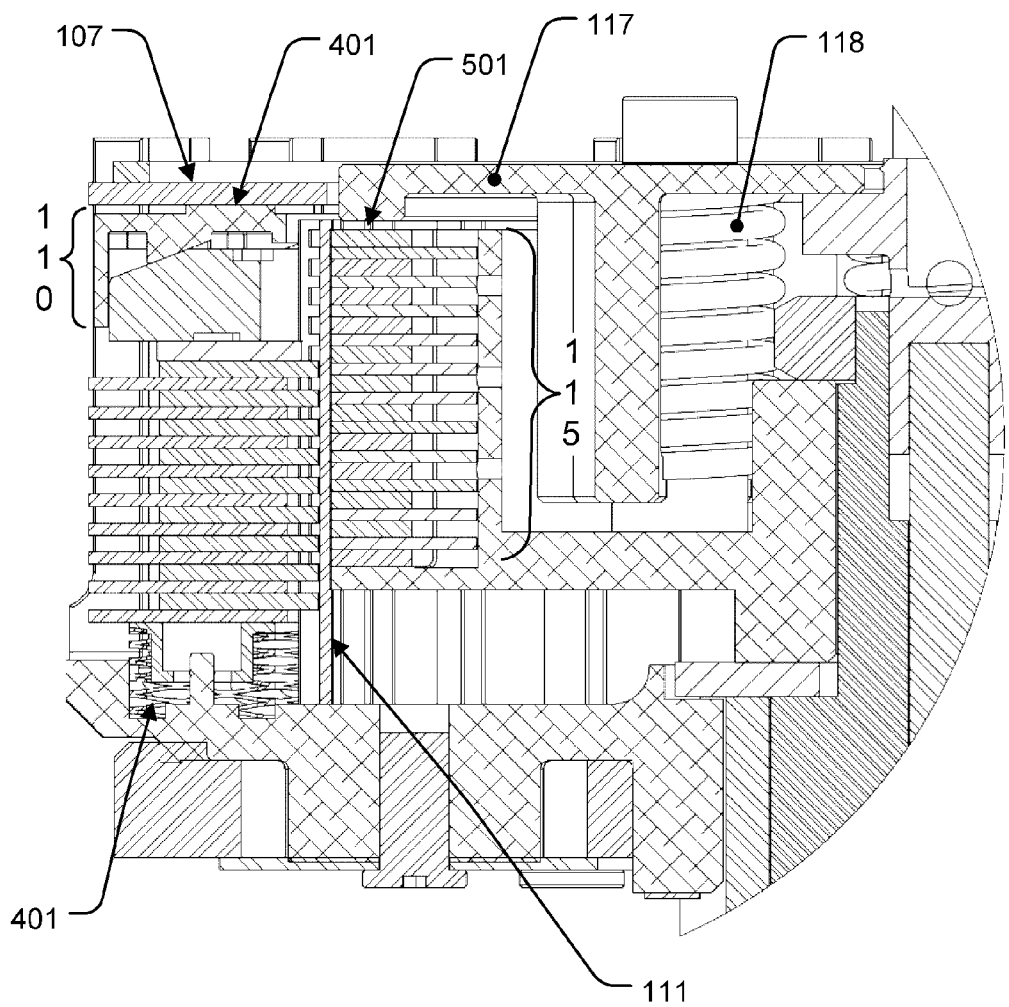
FIG. 5 is a detail cross section of a preferred embodiment of the invention incorporating an expanding friction disk where the expanding friction disk is incorporated in the outer clutch and is in the collapsed state and the inner clutch is spring loaded and in the disengaged state.

As can best be seen in FIGS. 3 through 5, the expanding friction disk 110 provides the axial expansion force necessary for automatic, centrifugal engagement of the outer clutch pack 109 at a pre-set speed. The details of the operation of the expanding friction disk 110 are fully described in the U.S. non-provisional utility patent application Ser. No. 12/412,245. Below a pre-set engine speed, the expanding friction disk 110 remains in a collapsed state. Above the pre-set engine speed, the expanding friction disk 110 creates an axial expansion force. The clutch 100 is configured with a gap 301. Below the pre-set speed, the gap 301 prevents the outer clutch pack 109 from rotationally coupling the clutch basket 104 with the coupling ring 111.

As can best be seen in FIG. 4, when the clutch basket 104 begins to rotate above the pre-set speed, the expanding friction disk 110 expands axially taking up the installed gap space 301, engaging 401 the outer clutch basket cover 107, applying axial expansion force to the outer clutch pack 109 causing frictional engagement of the outer clutch pack 109 and rotationally coupling the clutch basket 104 to the coupling ring.

In another embodiment of the invention, a centrifugal mechanism utilizing balls riding in radially formed ramps with a spring biased cover plate is utilized. Centrifugal mechanisms of this type are well known as typified by U.S. Pat. No. 6,533,036. In one embodiment, the ball-actuated centrifugal mechanism is formed as part of the clutch basket 104. In another embodiment, the ball-actuated centrifugal mechanism is formed as part of the outer cover plate.

The outer clutch pack 109 is also provided with a force limiting mechanism. The force limiting mechanism limits the amount of axial force the centrifugal mechanism can transfer to the outer clutch pack 109 and to the snap ring 108 and snap ring groove 201 of the clutch basket 104. Without a force limiting mechanism, excessive axial force generated by the centrifugal mechanism at high RPMs may cause damage to the snap ring 108 or snap ring groove 201. The force limiting mechanism is provided by the limit springs 105. The outer clutch pack 109 is limited in an axially inward direction by the limit spring retainers 106. When the expanding friction disk 110 expands, the outer clutch pack 109 pushes inward against the limit spring retainers 106. Ultimately, the axial force transferred to the clutch pack 109 and outward to the snap ring 108 is the force of the compressed limit springs 105.

The pressure plate 117 is configured to be in the engaged state; that is, the pressure plate springs 118 apply a force through the pressure plate 117 to the inner clutch pack 115, frictionally engaging the inner clutch pack 115 and consequently rotationally coupling the coupling ring 111 to the center clutch 113. Therefore, once the clutch basket 104 is spinning above the pre-set speed, the center clutch 113 will become rotationally coupled to the clutch basket 104 through the frictional engagement of the outer clutch pack 109 and inner clutch pack 115 through the coupling ring 111.

In this state, the operator may disengage the rotational coupling between the center clutch 113 and the clutch basket 104 by actuating the clutch lever (not shown) which in turn moves the actuator rod 102, throwout 116 and pressure plate 117 in an outward direction removing the axial force from the inner clutch pack 115 and rotationally disengaging the center clutch 113 from the coupling ring 111 and consequently rotationally disengaging the center clutch 113 from the clutch basket 104. Because the inner clutch pack 115 is axially isolated from the expanding friction disk 110, no change in clutch lever "feel" is experienced by the operator; regardless of the clutch basket 104 speed or the state of the expanding friction disk 110.

In another embodiment, the expanding friction disk 110 incorporates a torque sensitive expansion mechanism U.S. Pat. No. 3,239,042 discloses a set of torque sensitive disks that expands when the torque load is in a first direction and collapses when the torque load is reversed. When the torque sensitive disks are combined in the outer clutch pack 109 with the limit springs 105, the increased axial expansion from the torque sensitive disks when the toque load is in a first direction increases the compression on the limit springs 105 consequently increasing the torque capacity of the outer clutch pack 109. When the torque direction is reversed, the torque sensitive disks collapse and the decrease in axial expansion reduces the compression on the limit springs 105 consequently decreasing the torque capacity of the outer clutch pack 109. Again, because the torque sensitive mechanism is acting axially upon only the outer clutch pack 109, the clutch lever feel to the operator is not affected.

In another embodiment, the expanding friction disk 110 and torque sensitive disks are combined in the outer clutch pack 109 to create a centrifugally engaged, torque sensitive clutch mechanism.

While a preferred embodiment of the present invention has been described, it should be understood that various changes, adaptations and modifications may be made therein without departing from the spirit of the invention and the scope of the appended claims. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clutch apparatus comprising a first frictionally engageable clutch pack, an expanding friction disk, a second frictionally engageable clutch pack, a coupling ring, a pressure plate, a spring and a throwout; wherein said first frictionally engageable clutch pack is in outer spaced concentric relation to said second frictionally engageable clutch pack, said coupling ring is disposed between said first frictionally engageable clutch pack and said second frictionally engageable clutch pack, wherein said first frictionally engageable clutch pack is coupled to said coupling ring and said second frictionally engageable clutch pack is coupled to said coupling ring, and wherein said spring biases said pressure plate in a first direction to engage said second frictionally engageable clutch pack, wherein said spring does not act on said first frictionally engageable clutch pack, and said throwout biases said pressure plate in an opposite direction to disengage said second frictionally engageable clutch pack, and wherein said expanding friction disk is operable to expand axially under centrifugal force and provide the axial force necessary for automatic engagement of said first frictionally engageable clutch pack.

2. The clutch apparatus of claim 1 further comprising a clutch input and a clutch output and wherein said first frictionally engageable clutch pack is coupled rotationally with said clutch input and said second frictionally engageable clutch pack is coupled rotationally with said clutch output.

3. The clutch apparatus of claim 2 wherein when said first frictionally engageable clutch pack is in an engaged state and said second frictionally engageable clutch pack is in said engaged state, said clutch input is rotationally coupled to said clutch output.

4. The clutch apparatus of claim 3 wherein said second frictionally engageable clutch pack is configured for manual disengagement.

5. The clutch apparatus of claim 2 wherein when said first frictionally engageable clutch pack is in a disengaged state or said second frictionally engageable clutch pack is in said disengaged state, said clutch input is rotationally de-coupled from said clutch output.

6. The clutch apparatus of claim 2 wherein said first frictionally engageable clutch pack is disengaged when said clutch input is rotating below a first speed and wherein said first frictionally engageable clutch pack becomes engaged when said clutch input is rotating above said first speed.

7. The clutch apparatus of claim 6 wherein said first frictionally engageable clutch pack has a first torque capacity when said clutch input is applying a torque load, and wherein said first frictionally engageable clutch pack has a second torque capacity when said clutch input is receiving a torque load, and wherein said first torque capacity is greater than said second torque capacity.

8. The clutch apparatus of claim 7 wherein said second frictionally engageable clutch pack is configured for manual disengagement.

9. The clutch apparatus of claim 6 wherein said second frictionally engageable clutch pack is configured for manual disengagement.

10. The clutch apparatus of claim 2 wherein said first frictionally engageable clutch pack has a first torque capacity when said clutch input is applying a torque load, and wherein said first frictionally engageable clutch pack has a second torque capacity when said clutch input is receiving a torque load, and wherein said first torque capacity is greater than said second torque capacity.

11. The clutch apparatus of claim 1 wherein said spring is in direct contact with said pressure plate.

12. The clutch apparatus of claim 1 wherein the operation of said first frictionally engageable clutch pack is independent of said second frictionally engageable clutch pack.

13. A clutch apparatus comprising a first frictionally engageable clutch pack, an expanding friction disk, a second frictionally engageable clutch pack, a coupling ring, a pressure plate, a spring and a throwout; wherein said first frictionally engageable clutch pack is in outer spaced concentric relation to said second frictionally engageable clutch pack, said coupling ring is disposed between said first frictionally engageable clutch pack and said second frictionally engageable clutch pack, wherein said first frictionally engageable clutch pack is coupled to said coupling ring and said second frictionally engageable clutch pack is coupled to said coupling ring, and wherein said spring biases said pressure plate in a first direction to engage said second frictionally engageable clutch pack, wherein said throwout biases said pressure plate in an opposite direction to disengage said second frictionally engageable clutch pack, and wherein said expanding friction disk is operable to expand axially under centrifugal force and provide the axial force necessary for automatic engagement of said first frictionally engageable clutch pack and wherein the engagement and disengagement of said second frictionally engageable clutch pack by said pressure plate is independent of the operation of said first frictionally engageable clutch pack.

14. A clutch apparatus comprising a first frictionally engageable clutch pack, an expanding friction disk, a second frictionally engageable clutch pack, a coupling ring, a pressure plate, a spring and a throwout; wherein said first frictionally engageable clutch pack is in outer spaced concentric relation to said second frictionally engageable clutch pack, said coupling ring is disposed between said first frictionally engageable clutch pack and said second frictionally engageable clutch pack, wherein said first frictionally engageable clutch pack is coupled to said coupling ring and said second frictionally engageable clutch pack is coupled to said coupling ring, and wherein said spring biases said pressure plate in a first direction to engage said second frictionally engageable clutch pack, wherein said spring is in direct contact with said pressure plate, and said throwout biases said pressure plate in an opposite direction to disengage said second frictionally engageable clutch pack, and wherein said expanding friction disk is operable to expand axially under centrifugal force and provide the axial force necessary for automatic engagement of said first frictionally engageable clutch pack.

* * * * *